United States Patent
Starner et al.

(10) Patent No.: US 6,258,920 B1
(45) Date of Patent: Jul. 10, 2001

(54) POLYAMIDOAMINE CURING AGENTS BASED ON MIXTURES OF FATTY AND AROMATIC CARBOXYLIC ACIDS

(75) Inventors: William Edward Starner, Nesquehoning; David Alan Dubowik, Kempton; Frederick Herbert Walker, Allentown, all of PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 09/238,191

(22) Filed: Jan. 27, 1999

(51) Int. Cl.⁷ .............................. C08G 59/54; C09K 3/00
(52) U.S. Cl. .................. 528/113; 252/182.26; 523/420; 525/533
(58) Field of Search ............................ 525/533; 528/113; 252/182.26; 523/420

(56) References Cited

U.S. PATENT DOCUMENTS

| | | | |
|---|---|---|---|
| 2,705,223 | * 3/1955 | Renfrew et al. | 525/533 |
| 3,425,961 | * 2/1969 | Jellinek et al. | 525/533 X |
| 3,639,657 | * 2/1972 | Moran, Jr. et al. | 528/113 X |
| 4,086,197 | * 4/1978 | Bouche et al. | |
| 4,247,426 | * 1/1981 | Hinze et al. | 528/113 X |
| 4,732,966 | * 3/1988 | Wilson | 525/526 X |
| 4,937,296 | * 6/1990 | Golownia | 525/533 X |
| 5,036,144 | * 7/1991 | Weiss | 525/533 X |
| 5,616,658 | * 4/1997 | Gras et al. | 528/113 X |

FOREIGN PATENT DOCUMENTS

789108 * 1/1958 (GB).

* cited by examiner

Primary Examiner—Richard D. Lovering
(74) Attorney, Agent, or Firm—Michael Leach

(57) ABSTRACT

Compositions of amine terminated polyamidoamine resins useful for curing epoxy resins are disclosed comprising combinations of fatty monocarboxylic acids, aromatic mono- and dicarboxylic acids, and polyethyleneamines, wherein the ratio of equivalents of fatty monocarboxylic acid to aromatic monocarboxylic acid can range from about 1:0.2 to about 1:1.5, the ratio of equivalents of monocarboxylic acids to aromatic dicarboxylic acid can range from about 1:0.1 to about 1:0.6, and the ratio of moles of total polyamine to equivalents of total acid can range from about 0.8:1 to about 1.3:1. Coating compositions comprising these polyamidoamine resins are also disclosed.

15 Claims, No Drawings

POLYAMIDOAMINE CURING AGENTS BASED ON MIXTURES OF FATTY AND AROMATIC CARBOXYLIC ACIDS

FIELD OF THE INVENTION

This invention relates to polyamidoamine curing agents for epoxy resins useful for the preparation of coatings and related products.

BACKGROUND OF THE INVENTION

Coatings based on epoxy resins are important industrial products. The largest volume of these products is used for the protection and decoration of large metal or concrete structures such as bridges, ships, industrial tanks, etc., where application of the coating must be performed under ambient conditions. Epoxy coatings of this type have proven themselves to offer an excellent combination of corrosion resistance, water resistance, abrasion resistance, solvent resistance and other desirable coatings properties, and do so in a cost effective manner.

Most epoxy resin coatings designed for ambient application employ polyfunctional amines as the curing agent, either alone or in some cases in combination with other curing agents. Several classes of amine curing agents are used commercially, including aliphatic amines, amine adducts, Mannich bases, polyamides, and polyamidoamines which are also known as amidoamines. They are described more fully in W. R. Ashcroft, Curing Agents for Epoxy Resins, in B. Ellis (ed.), Chemistry and Technology of Epoxy Resins, Blackie Academic and Professional, London, 1993, pp 37–71.

Among these curing agents, polyamides are a particularly important class of curing agent for the formulation of coatings. Polyamides are comprised of the reaction products of dimerized fatty acid (dimer acid) and polyethyleneamines, and usually a certain amount of monomeric fatty acid which helps to control molecular weight and viscosity. "Dimerized" or "dimer" or "polymerized" fatty acid refers, in a general way, to polymerized acids obtained from unsaturated fatty acids. They are described more fully in T. E. Breuer, 'Dimer Acids', in J. I. Kroschwitz (ed.), Kirk-Othmer Encyclopedia of Chemical Technology, $4^{th}$ Ed., Wiley, N.Y., 1993, Vol. 8, pp. 223–237. Dimer acid is usually prepared by the acid catalyzed oligomerization under pressure of certain monomeric fatty acids, usually tall oil fatty acid (TOFA), though sometimes other vegetable acids are substituted. Commercial products generally consist of mostly (>70%) dimeric species, with the rest consisting mostly of trimers and higher oligomers, along with small amounts (generally less than 5%) of monomeric fatty acids. Any of the higher polyethyleneamines can be employed in the preparation of polyamides, such as diethylenetriamine (DETA), triethylenetetramine (TETA), tetraethylenepentamine (TEPA), or pentaethylenehexamine (PEHA), though in actual commercial practice the polyethyleneamine most commonly employed is TETA.

Polyamidoamines are another important class of curing agents. Whereas commercial polyamides are available in viscosities ranging from about 10,000 to 500,000 cP, polyamidoamine viscosities are generally in the range of about 100 to 700 cP. This is clearly an advantage over polyamides when trying to formulate coatings and related products with no solvent, or a minimum amount of solvent. They are the reaction product of a monomeric fatty acid such as TOFA and a polyethyleneamine. The polyethyleneamine most commonly employed in this case is TEPA, even though TETA is a less expensive raw material. The reason that TEPA is used for polyamidoamines is that it yields products that remain completely liquid at temperatures normally encountered in their use and storage. Polyamidoamines based on TETA, on the other hand, generally have a marked tendency to crystallize even at room temperature. This creates considerable difficulties for end users, who must melt the material to obtain a uniform mixture before use. Alternatively, the product could be supplied in a solvent, but this is a disadvantage because environmental regulations now restrict the amount of solvent allowed in formulations, and many epoxy applications require the use of formulations containing no solvent.

Polyamides are employed because they allow for the formulation of coatings with an excellent combination of water and corrosion resistance, most likely due to the hydrophobicity imparted by the fatty nature of the starting materials. They also can offer excellent flexibility and reasonable cure speeds (drying times). Polyamidoamines are used much less in coatings than are polyamides, though they also yield hydrophobic films with good water resistance. Part of the reason is that polyamidoamines generally yield less flexible films than polyamides. However, probably more important is the poor surface appearance that is obtained with the use of polyamidoamines when compared to polyamides.

There is a tendency for many epoxy curing agents to rise to the surface of a coating during the cure. This can leave a greasy film on the surface of the coating known as exudate, which detracts from the appearance, and which can also lead to intercoat adhesion failure if the epoxy is a primer or mid-coat. Under adverse application conditions such as high humidity, a high concentration of the amines at the surface can result in the formation of whitish precipitates on the surface which are probably bicarbonate and/or carbamate salts, a problem known in the industry as blush. Polyamides are much better than polyamidoamines in this regard. Though they may not be completely free of blush and exudate if applied immediately after mixing, it is generally found that if the materials are allowed to react for about 30 minutes to 1 hour before application that the blush and exudate are eliminated. This waiting period is called an induction time.

Polyamidoamines, on the other hand, generally give much higher levels of blush and exudate, and even after several hours of induction they may still exhibit blush and exudate. Polyamidoamines also display a strong tendency to 'crawl' and 'puddle' on the substrate, and generally yield films that have unacceptable appearance. Flow additives added to such a formulation are generally less than satisfactory in curing this problem. Once again, polyamides are superior to polyamidoamines in this property.

Another important property of an epoxy based coating is the speed at which it cures, or its 'dry time'. Generally, users of epoxy coatings prefer dry times to be as short as possible for obvious reasons.

Another important property of an epoxy based coating is the mixed viscosity of the epoxy resin and the curing agent. This will clearly have an effect on how much solvent is required to reduce the viscosity of a coating formulation to the point where acceptable application properties are achieved. Usually curing agents are employed at stoichiometric ratios of equivalents of epoxide to equivalents of amine hydrogen close to unity. This stoichiometry generally yields the highest crosslink density final product, and most properties are also maximized at this ratio. Polyamidoamines tend to have amine hydrogen equivalent weights from about 65 to 105. If equivalent weight were higher, curing agent would be a higher percentage of the total amount of material in the epoxy resin and curing agent blend at 1:1 stoichiometry. If the curing agent is significantly lower in viscosity than epoxy resin then increasing the equivalent weight of the curing agent will result in a lower mixed viscosity.

GB 789,108 discloses polyamides made by condensation of a polyamine with a saturated aliphatic acid of the formula HOOC(CH2)nCOOH where n is an integer from 3–12 or an aromatic dicarboxylic acid. Aromatic dicarboxylic acids include isophthalic and terephthalic acid. It is claimed that the solubility and compatibility properties of the polyamides may be improved if up to 60 mole % of the dicarboxylic acid is replaced by a monocarboxylic acid. Suitable monocarboxylic acids include fatty acids and benzoic acid, and it is "understood that in the formation of the polyamides mixtures of polyamines and/or carboxylic acids may be used" (p.2, col.1, I. 18–19.) One example shows a mixture of adipic acid and benzoic acid reacted with TETA, and another shows dimethyl terephthalate reacted with TETA.

U.S. Pat. No. 4,732,966 discloses polyamides containing free amino groups derived from (a) a polybasic acid component comprising polymeric fatty acid (i.e., dimer fatty acid) together with from 10 to 90 mole %, based on the total acid component, of one or more aromatic dicarboxylic acids, and (b) a polyamine containing at least 50 mole % of one or more aliphatic polyamines containing at least three amino groups per molecule. In the disclosure, it is stated that "the acid component should contain at least 10 mole % of polymeric fatty acid, preferably at least 30 mole % thereof" (Col 2/51–53).

U.S. Pat. No. 4,086,197 discloses polyamino-amide hardener prepared from 90 to 60 parts of at least one unsaturated monomeric fatty acid having at least 12 carbons, 10 to 40 parts of an acid having a molecular weight less than 200, 20 to 80 parts of a polyalkylene-polyamine, and 80 to 20 parts of isophorone diamine, with the ratio of acid to amine components being 1 to 2 eq. of acid per mole of amine. Benzoic acid is among the monocarboxylic acids with a molecular weight less than 200 that is recommended and also was used in the examples. I. Slowikowska, A. Kozlowski, and K. Zawalska, *Ipolimery-Tworzywa Wielkoczasteczkowe*, 1980, pp. 291–292 investigated the cure characteristics and mechanical properties of epoxy resins cured with polyamidoamines based on benzoic acid and TETA.

R. H. E Munn, *Journal Oil and Coulor Chem. Assoc.*, 1987 (10), pp 300–304 describes the modification of traditional dimer acid-based polyamide curing agents with terephthalic, and particularly isophthalic acid. Such modification leads to good compatibility and dry speed and freedom from surface defects.

SUMMARY OF THE INVENTION

The present invention provides compositions of amine terminated polyamidoamine resins useful for curing epoxy resins. The epoxy curing agent compositions comprise the reaction product of a fatty monocarboxylic acid, an aromatic monocarboxylic acid, an aromatic dicarboxylic acid, and a polyethyleneamine. Coating compositions comprising these polyamidoamine resins and an epoxy resin are another embodiment of the invention.

These polyamidoamine curing agents possess certain desirable properties not found in the prior art polyamidoamine curing agents such as a combination of low viscosity, stability to crystallization well below room temperature and higher equivalent weight. The cured epoxy coatings exhibit improved properties such as low blush and exudate, good surface appearance and acceptably fast dry times.

DETAILED DESCRIPTION OF THE INVENTION

The fatty acids used in the current invention are those composed primarily of C14 to C22 monocarboxylic acids containing from 0 to about 4 units of unsaturation. Usually, such fatty acids will be mixtures derived from triglycerides of natural products, such as castor, coconut, corn, cottonseed, grapeseed, hempseed, kapok, linseed, wild mustard, oiticica, olive, palm, palm kernel, peanut, perilla, poppyseed, rapeseed, safflower, sesame, soybean, sugarcane, sunflower, tall, teaseed, tung, uchuba, and walnut oils. Pure fatty acids or mixtures of pure fatty acids, such as stearic, palmitic, oleic, linoleic, linolenic, and like acids may also be employed, as can various esters of any of these fatty acids, particularly the C1 to C4 esters or the triglyceride ester. Also of utility is isostearic acid, also known as monomer acid. Monomer acid is the mostly C18 fatty mono-acid stream derived from the preparation of dimer acid.

The preferred fatty acids are tall oil fatty acid (TOFA) and soya fatty acid. The most preferred fatty acid is tall oil fatty acid.

The aromatic monocarboxylic acids are compounds containing one carboxylic acid group and at least one benzene ring, the carboxylic acid group being directly linked to a benzene ring. Where the acid contains two benzene rings these may be directly linked to each other or via the intermediary of a short length linking group such as an oxygen atom or methylene group. Particular examples of aromatic monocarboxylic acids include benzoic acid, salicylic acid, naphthoic acid, and various alkyl substituted benzoic and naphthoic, acids, where there are one or two alkyl chains on the aromatic ring, and where the alkyl chains have from 1 to about 4 carbon atoms.

The preferred aromatic monocarboxylic acid is benzoic acid. The ratio of equivalents (eq) of fatty acid to aromatic monocarboxylic acid can be varied from about 1:0.2 to 1:1.5. The preferred eq ratio is about 1:0.4.

The aromatic dicarboxylic acids are compounds containing two carboxylic acid groups and at least one benzene ring, each carboxylic acid group being directly linked to a benzene ring. Where the acid contains two benzene rings these may be directly linked to each other or via the intermediary of a short length linking group such as an oxygen atom or methylene group. Particular examples of aromatic dicarboxylic acids, which may be used include isophthalic acid, terephthalic acid, diphenic acid (diphenyl-2,2'-dicarboxylic acid), and diphenyl ether4,4'-dicarboxylic acid.

The preferred aromatic dicarboxylic acids are isophthalic acid and terephthalic acid. The ratio of total eq of monocarboxylic acids (including both fatty and aromatic types) to eq aromatic dicarboxylic acid can be varied from about 1:0.1 to about 1:0.6. The preferred ratio is about 1:0.35.

The polyethyleneamines of the current invention are those of the structure:

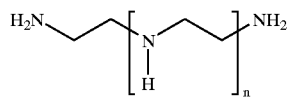

where n is an integer ranging from 1 to about 6. It will be appreciated by those skilled in the art that polyethyleneamines of commerce where n is ≧2 are not pure products, but are mixtures that also contain substantial portions of branched and cyclic congeners, where congeners refers to species that contain the same number of heteroatoms, in this case nitrogen. Thus, triethylenetetramine (TETA) contains not only the linear structure with n=2 shown above, but also the branched isomer:

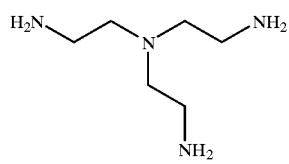

and the following two cyclic congeners:

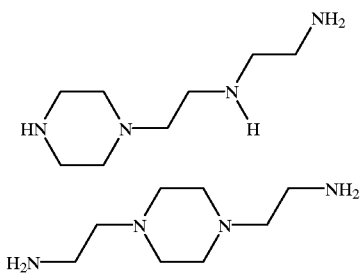

Mixtures of polyethyleneamines can be employed as well. Examples of polyethyleneamines include ethylenediamine (EDA), diethylenetriamine (DETA), triethylenetetramine (TETA), tetraethylenepentamine (TEPA), pentaethylenehexamine (PEHA), and the higher polyethyleneamines.

Other useful polyethyleneamines include piperazine ring-containing polyamines having an N—H functionality of 2 or 3 per mole such as piperazine, or N-aminoalkyl-piperazine, where the alkyl chain is a C2 to C6 alkyl chain, preferably N-amino-ethylpiperazine (AEP). It has been discovered that condensation of AEP with carboxylic acids occurs preferentially on the primary amine, leaving only one active hydrogen for reaction with epoxy resin. If piperazine reacts on only one end with a carboxylic acid, it likewise leaves only one active hydrogen for reaction with epoxy resin. In this way, the equivalent weight of the final polyamidoamine is increased, leading to the desirable result of reduced viscosity when formulated with a higher viscosity epoxy resin.

The preferred polyethyleneamines are a mixture of TETA and AEP in a molar ratio of from 1:0.05 to 1:0.50, and the most preferred polyethyleneamines are a mixture of TETA and AEP in a molar ratio of about 1:0.15.

The ratio of total moles of polyamine (including the piperazine ring containing polyamines) to equivalents of acid is a crucial parameter in determining the properties of the resulting polyamidoamines. Those skilled in the art will recognize that this parameter will have a large influence on the molecular weight and hence the viscosity of the polyamidoamine produced. Furthermore, this ratio also influences the amine hydrogen equivalent weight (AHEW) of the final product, and has an effect upon the amount of unreacted polyamine present after completion of the condensation reaction. Suitable ratios of total moles of polyamines to total equivalents of acids range from about 0.8:1 to about 1.3:1, preferably from 0.9:1 to 1:1.

If desired, the composition can be optionally modified by the incorporation of other polyamines. Examples include meta-xylylene diamine, the various isomers of diaminocyclohexane, isophorone diamine, 3,3'-dimethyl-4,4'-diaminodicyclohexyl methane, 4,4'-diaminodicyclohexyl methane, 2,4'-diaminodicyclohexyl methane, the mixture of methylene bridged poly(cyclohexyl-aromatic)amines (MBPCAA) described in U.S. Pat. No. 5,280,091, 1,2-propylene diamine, 1,3-propylene diamine, 1,4-butanediamine, 1,5-pentanediamine, 1,3-pentanediamine, 1,6-hexanediamine, 3,3,5-trimethyl-1,6-hexanediamine, 3,5,5-trimethyl-1,6-hexanediamine, 2-methyl-1,5-pentanediamine, bis-(3-aminopropyl)amine, N, N'-bis-(3-aminopropyl)-1,2-ethanediamine, N-(3-amino-propyl)-1,2-ethanediamine, 1,2-diaminocyclohexane, 1,3-diaminocyclohexane, 1,4-diaminocyclohexane, the poly(alkylene oxide) diamines and triamines, such as for example Jeffamine D-230, Jeffamine D-400, Jeffamine D-2000, Jeffamine D-4000, Jeffamine T-403, Jeffamine EDR-148, Jeffamine EDR-192, Jeffamine C-346, Jeffamine ED-600, Jeffamine ED-900, and Jeffamine ED-2001. The composition can either be modified by incorporating these polyamines in the condensation reaction, or by adding them to the polyamidoamine after completion of the condensation reaction. In the former case, it is then necessary to adjust the ratio of moles of polyamine to equivalents of acid to conform with the guidelines given above.

Polyamidoamines of the current invention can be manufactured by any number of processes known to those skilled in the art. Normally, the amines and acids are combined at temperatures ranging from about room temperature to about 100° C. Heat is then supplied to raise the temperature as water is condensed from the reaction mixture. Heating is normally continued until the specified amount of water is removed that will yield a product with the desired imidazoline and amide content. Increasing the level of imidazoline, among other things, generally increases set-to-touch time, pot life and resistance to crystallization. Optionally, vacuum can be applied particularly in the late stages of the process to aid in the removal of water from the mixture. To reduce foaming, which can be a problem particularly under vacuum conditions, small amounts of defoamers may be added to the polyamidoamine composition. Appropriate defoamers include various acrylic copolymers containing 2-ethylhexyl acrylate as part of the copolymer composition, various polysiloxane copolymers, and the like.

An alternative approach to the preparation of polyamidoamine compositions of the current invention is to prepare separately one or more products using the components required for the polyamidoamine composition described above, and then blending those separately prepared products, possibly with some of the components, to form a final mixture which falls within the guidelines given above for the ratio of equivalents of fatty monoacid to aromatic monocarboxylic acid, the ratio of equivalents of monocarboxylic acids to aromatic dicarboxylic acid, and the ratio of total moles of polyamine to equivalents of acid.

For example, the following reaction products-could be prepared by reacting variations of the individual components:

a polyethyleneamine and an aromatic monocarboxylic acid;

a polyethyleneamine and an aromatic dicarboxylic acid;

a polyethyleneamine and a fatty monocarboxylic acid;

a polyethyleneamine, an aromatic monocarboxylic acid and a fatty monocarboxylic acid;

a polyethyleneamine, an aromatic dicarboxylic acid and a fatty monocarboxylic acid; and a polyethyleneamine, an aromatic monocarboxylic acid and an aromatic dicarboxylic acid.

These reaction products could then be blended within certain ranges, with or without the addition of one or more of the individual components, to form compositions falling within the scope of this invention. The process for the preparation of the polyamidoamines of the present invention described above can also be employed for the preparation of the reaction products listed above that are further blended.

The polyamidoamine curing agent, or hardener, is combined with an epoxy resin which is a polyepoxy compound containing more than one 1,2-epoxy groups per molecule. Such epoxides are well known in the epoxy coating art and are described in Y. Tanaka, "Synthesis and Characteristics of Epoxides", in C. A. May, ed., Epoxy Resins Chemistry and Technology (Marcel Dekker, 1988). Examples include those epoxides disclosed in U.S. Pat. No. 5,599,855 Columns 5/6 to 6/20, which is incorporated by reference. The preferred polyepoxy compounds are the diglycidyl ethers of bisphenol-A, the advanced diglycidyl ethers of bisphenol-A, the diglycidyl ethers of bisphenol-F, and the epoxy novolac resins.

To reduce the viscosity of a given formulation of polyamidoamines of the current invention with a di-or multifunctional epoxy resin, the epoxy resin may be modified with a portion of monofunctional epoxide. In this way viscosity is further reduced, which may be advantageous in certain cases, such as for example to increase the level of pigment in a formulation while still allowing easy application, or to allow the use of a higher molecular weight epoxy resin. Examples of useful monoepoxides include styrene oxide, cyclohexene oxide, and the glycidyl ethers of phenol, the cresols, tert-butylphenol and other alkyl phenols, butanol 2-ethyl-hexanol, and C8 to C14 alcohols and the like.

Polyamidoamines of the current invention would normally be formulated with epoxy resins at stoichiometric ratios of epoxy groups to amine hydrogen ranging from about 1.5 to 1 to about 1 to 1.5. More preferred are ranges from 1.2 to 1 to 1 to 1.2, and most preferred are 1.1 to 1 to 1 to 1.1.

It is also possible to modify the polyamides of the current invention by reacting a modest portion of the amine hydrogen with difunctional and monofunctional epoxy resins such as those described above. This is a common practice well known to those skilled in the art, and generally referred to as adduction. By adducting with difunctional and monofunctional epoxy resins it is possible to improve the compatibility of the polyamidoamine with epoxy resin and thereby reduce problems such as blush, carbonation and exudation, and to increase pot life. On the other hand, such modification tends to increase viscosity, particularly in the case of difunctional epoxy resins, and may in some cases also decrease the rate of cure. Particularly useful epoxy resins for adduction include the diglycidyl ethers of bisphenol-A, the advanced diglycidyl ethers of bisphenol-A, the diglycidyl ethers of bisphenol-F, styrene oxide, cyclohexene oxide, and the glycidyl ethers of phenol, the cresols, tert-butylphenol and other alkyl phenols, butanol, 2-ethylhexanol, and C8 to C14 alcohols and the like. The most preferred epoxy resin for adduction is the diglycidyl ether of bisphenol-A.

In some circumstances it may be advantageous to incorporate so-called accelerators for the epoxy-amine curing reaction in formulations based on polyamidoamines of the current invention. Such accelerators are described in H. Lee and K. Neville, Handbook of Epoxy Resins, McGraw-Hill, New York, 1967. Suitable accelerators include various organic acids, alcohols, phenols, tertiary amines, hydroxylamines, and the like. Particularly useful accelerators include benzyl alcohol, phenol, alkyl substituted phenols such as nonylphenol, octylphenol, t-butylphenol, cresol and the like, bisphenol-A, salicylic acid, dimethylaminomethylphenol, bis(dimethylaminomethyl) phenol, and tris(dimethylaminomethyl)phenol. Normally, such accelerators are used at levels of 10% or less based on the total weight of binder, and more usually at levels of less than 5%.

In some circumstances in may be advantageous to incorporate plasticizers for the epoxy-amine network in formulations based on polyamidoamines of the current invention. This is particularly useful in cases where, in the absence of such a plasticizer, the glass transition temperature, Tg, of the composition significantly exceeds the ambient temperature before the degree of reaction necessary to meet certain requirements such as solvent and chemical resistance and tensile strength has been achieved. Such plasticizers are well known to those skilled in the art, and are described more fully in D. F. Cadogan and C. J. Howick, 'Plasticizers', in J. I. Kroschwitz, ed., Kirk-Othmer Encyclopedia of Chemical Technology, $4^{th}$ Ed., Wiley, N.Y., 1996, Vol 19, pp 258–290. Particularly useful plasticizers include benzyl alcohol, nonylphenol, and various esters of phthalic acid. The ester plasticizers would normally be incorporated in the same package as the epoxy resin to minimize reaction with the amine curing agent.

Coatings prepared from polyamidoamines of the present invention and epoxy resins can be formulated with a wide variety of ingredients well known to those skilled in the art of coating formulation, including solvents, fillers, pigments, pigment dispersing agents, rheology modifiers, thixotropes, flow and leveling aids, defoamers, etc. Mixtures of solvents will frequently be chosen so as to give the best evaporation rate profile for the system while maintaining solubility of the binder components. Suitable solvents include aromatics, aliphatics, esters, ketones, ethers, alcohols, glycols, glycol ethers, and the like. Particularly useful in the formulation are some level of ketones such as acetone, methyl ethyl ketone, methyl isoamyl ketone, methyl propyl ketone, methyl amyl ketone, diacetone alcohol and the like, which can be used to improve pot life with little or no sacrifice in dry speed. If ester solvents are included in the formulation, it is usually necessary to formulate them in the package containing the epoxy resin, so as to minimize their reaction with the amine curing agent.

Coatings of this invention can be applied by any number of techniques including spray, brush, roller, paint mitt, and the like. Numerous substrates are suitable for application of coatings of this invention with proper surface preparation, as is well understood in the art. Such substrates include but are not limited to many types of metal, particularly steel and aluminum, as well as concrete.

Coatings of this invention can be applied and cured at ambient temperatures ranging from about 0° C. to about 50° C., with temperatures of 10° C. to 40° C. preferred. If desired, these coatings can also be force cured at temperatures up to 100° C. or more.

EXAMPLE 1

In a 2000 mL 4 necked roundbottom flask equipped with a mechanical stirrer, thermometer, a 24 in (61 cm) silvered vacuum-jacketed distillation column packed with Pro-pack metal support, vacuum distillation take-off head, and heating mantle was placed 46.72 g AEP, 352.49 g TETA, 460.98 g TOFA (Acintol FA-2, Arizona Chemical Co.), 76.26 g benzoic acid, and 63.55 g terephthalic acid. These amounts correspond to 0.94 mole amine/eq. acid, 0.15 mole AEP/mole TETA, 0.400 eq. benzoic acid/eq. fatty acid, and 0.35 eq. aromatic dicarboxylic acid/total eq. monocarboxylic acids. The mixture was heated to about 120° C., and then a vacuum of 260 torr was applied. The temperature was raised while distilling off water until a final temperature of 250° C. was reached, at which point heating was discontinued and the reaction mixture was cooled. By weighing the reaction flask containing the ingredients before and after the reaction, it was determined that 81.76 g of aqueous distillate had been removed. The aqueous distillate was analyzed by titration with 0.1N $HClO_4$ in glacial acetic acid to contain 5.58% AEP. The product was a clear, orange liquid with a viscosity of 969 cP at 25° C., and a calculated amine hydrogen equivalent weight (AHEW) of 115 g/eq. N—H. When cooled to 40° F. (4.4° C.) for 24 hr., the material remained completely liquid. The AHEW was calculated using the following formula:

$$AHEW = \frac{Product\ Weight}{[Initial\ eq\ amine\ hydrogen - (2 \times eq\ acid) - eq\ imidazoline\ formed]}$$

Where:

Equivalents of imidazoline=moles of water produced−initial eq of acid

All values in the above equation were adjusted for the measured amount of AEP lost in the aqueous distillate.

EXAMPLE 2

The procedure of Example 1 was repeated. In this case, 80.53 g aq distillate was removed, which was analyzed to contain 7.32% AEP. After cooling the reaction mixture to 100° C., 36.48 g of Epon 828 (diglycidyl ether of bisphenol-A, Shell Chem. Co.) was added to the mixture, which was maintained at that temperature for 1 hour. The final product was a clear orange liquid with a viscosity of 2264 cP, and a calculated AHEW of 122. When cooled to 40° F. (4.4° C.) for 24 hr., the material remained completely liquid.

COMPARATIVE EXAMPLES 3–5

Polyamidoamine compositions were prepared according to the procedure of example 1, using the ingredients shown in Table 1.

TABLE 1

| Example | 3 | 4 | 5 |
|---|---|---|---|
| Ingredients | | | |
| AEP | 36.81 | 61.57 | 61.57 |
| TETA | 277.44 | 464.06 | 464.06 |
| TOFA | 685.75 | | |
| Benzoic Acid | | 474.37 | 474.37 |
| Ratios of Ingredients | | | |
| Amine/Acid (mol./eq.) | 0.94 | 0.94 | 0.94 |
| AEP/TETA (mol./mol.) | 0.15 | 0.15 | 0.15 |
| Reaction Conditions | | | |
| Pressure (torr) | 260 | 260 | 500 |
| Final Temp. (248C) | 250 | 250 | 250 |

TABLE 1-continued

| Example | 3 | 4 | 5 |
|---|---|---|---|
| Analysis | | | |
| Wt. Aq. Distillate | 62.90 | 150.93 | 100.97 |
| % AEP in Distillate | 0 | 29.19 | 7.10 |
| Appearance at Rm. Temp. | Opaque Semi-solid | Clear Liquid | Clear Liquid |
| Appearance at 40° F. | Opaque Semi-solid | Clear Liquid | Clear Liquid |
| Viscosity, 25° C. | Not Measurable | 18,020 | 11,790 |
| AHEW (calc.) | 146 | 111 | 82 |

Under the conditions used to prepare Examples 1–3, most of the AEP was lost during the preparation of Example 4. Therefore, it was repeated at a higher pressure to yield a more comparable sample (Ex 5). The viscosity of a polyamidoamine prepared using benzoic acid as the sole acid has a much higher viscosity (Ex 5) than the composition of Example 1. When prepared solely from TOFA (Ex 3), the resulting polyamidoamine is a semi-solid, and thus cannot be commercially supplied at 100% solids.

EXAMPLES 6–11

Solventless clearcoats with a total 150 g mass were prepared from the polyamidoamines of Examples 1–5 with Epon 828 resin at a stoichiometric ratio of 1 eq. of amine hydrogen per 1 eq. of epoxide, using an equivalent weight of 190 for Epon 828 resin. After the specified induction time, coatings were drawn down on polished, cold rolled steel Q panels (Q-Panel Lab Products Co., Cleveland, Ohio) with a draw-down bar to yield coatings with a dry film thickness of about 2 mils (50 μm). Properties of the coatings are shown in Table 2. Gel times were measured using a Techne gelation timer. Thin film set times were measured with a BK gel timer (Paul Gardner Co., Pompano Beach, Fla.), with the set time being recorded as the time when the needle first comes off the glass plate. Exudate was qualitatively evaluated on a scale of 1 (worse) to 10 (best). A rating of 8 indicates a very light, barely detectable film on the surface. A rating less than 5 indicates exudate severe enough that the surface remains tacky.

TABLE 2

| Example | 6 | 7 | 8 | 9 | 10 |
|---|---|---|---|---|---|
| Polyamidoamine | Ex 1 | Ex 5 | Ex 3 | Ex 3 | Ex 2 |
| Initial Mix Viscosity (cP) | 2,560 | 10,320 | 938 | 938 | 4,400 |
| Gel Time (min.) | 50 | 22 | 192 | 192 | 60* |
| Induction Time (min.) | 30 | 0 | 30 | 60 | 0 |
| Thin Film Set Time (hr.) | 5.2 | 2.4 | 12.8 | 9.6 | 6.0 |
| Film appearance | Good | Good | Severely Cratered & Puddled | Good | Good |
| Exudate | 8 | 10 | 1 | 8 | 9 |
| Adhesion (ASTM D 3359) | 3B | 2B- | NM | 4B | |
| Forward Impact (in-lb) (ASTM D 2794) | 32 | 12 | NM | 160 | 120 |
| 7 Day Pencil Hardness-Scratch (ASTM D 3363) | F | H | NM | 2B | F |

TABLE 2-continued

| Example | 6 | 7 | 8 | 9 | 10 |
|---|---|---|---|---|---|
| 7 Day Pencil Hardness-Gouge (ASTM D 3363) | H | 2H | NM | B | |
| 7 Day Humidity Resistance (ASTM D 4585) | No Effect | Whitened, Hazy | NM | No Effect | No Effect |

NM = not measurable due to poor, discontinuous film quality.

The coating based on the polyamidoamine of Ex 1 had a much lower viscosity, better adhesion, better impact resistance, and better humidity resistance than the coating based on the polyamidoamine of Ex 5. Although the latter required no induction time, it also had a very short gel time (Ex 7) which would make it unsuitable for use in most applications. Formulations based on the polyamidoamine of Ex 3 suffered from a high degree of incompatibility as evidenced by the very poor film appearance and high level of exudate at an induction time of 30 min. They required an hour of induction time, had very long thin film set times, and resulted in soft films. Clearly, a better balance of properties was obtained using a curing agent of Examples 1 and 2.

STATEMENT OF INDUSTRIAL APPLICATION

The invention provides polyamidoamines curing agents for epoxy resin coating compositions.

We claim:

1. A polyamidoamine curing agent composition for epoxy resins comprising the reaction product of a mixture comprising
   (a) a fatty monocarboxylic acid,
   (b) an aromatic monocarboxylic acid,
   (c) an aromatic dicarboxylic acid, and
   (d) a polyethylene amine,
reacted in the following ratios:
   (1) 1:0.2–1.5 equivalents of fatty monocarboxylic acid per equivalents aromatic monocarboxylic acid;
   (2) 1:0.1–0.6 equivalents monocarboxylic acids per equivalent of aromatic dicarboxylic acid; and
   (3) 0.8–1.3:1 moles of total polyamines per equivalents of total acid.

2. The polyamidoamine curing agent composition of claim 1 in which the fatty monocarboxylic acid is tall oil fatty acid and/or soya fatty acid.

3. The polyamidoamine curing agent composition of claim 1 in which the aromatic monocarboxylic acid is benzoic acid.

4. The polyamidoamine curing agent composition of claim 1 in which the aromatic dicarboxylic acid is isophthalic acid and/or terephthalic acid.

5. The polyamidoamine curing agent composition of claim 1 in which the polyethylene amine is triethylenetetramine or a mixture of triethylenetetramine and N-aminoethyl-piperazine in a 1:0.05–0.5 molar ratio.

6. The polyamidoamine curing agent composition of claim 1 in which the fatty monocarboxylic acid is reacted with the aromatic monocarboxylic acid in an equivalents ratio of about 1:0.4.

7. The polyamidoamine curing agent composition of claim 1 in which about 0.35 equivalents of monocarboxylic acids are reacted per equivalent of aromatic dicarboxylic acid.

8. The polyamidoamine curing agent composition of claim 1 in which 0.9–1:1 moles of total polyamines per equivalents of total acid are reacted.

9. The polyamidoamine curing agent composition of claim 1 in which the fatty monocarboxylic acid is tall oil fatty acid and/or soya fatty acid, the aromatic monocarboxylic acid is benzoic acid, the aromatic dicarboxylic acid is terephthalic acid and the polyethylene amine is a mixture of triethylenetetramine and N-aminoethyl-piperazine in a 1:0.05–0.5 molar ratio.

10. A coating composition comprising a polyepoxide resin and a polyamidoamine curing agent composition of claim 1.

11. A polyamidoamine curing agent composition for epoxy resins comprising the reaction product of a mixture comprising
   (a) a fatty monocarboxylic acid which is tall oil fatty acid or soya fatty acid,
   (b) benzoic acid,
   (c) an aromatic dicarboxylic acid which is isophthalic acid or terephthalic acid, and
   (d) a polyethyleneamine mixture of triethylenetetramine and N-aminoethyl-piperazine in a 1:0.05–0.5 molar ratio,
reacted in the following ratios:
   (1) 1:0.2–1.5 equivalents of said fatty monocarboxylic acid per equivalents benzoic acid;
   (2) 1:0.1–0.6 equivalents said monocarboxylic acids per equivalent of said aromatic dicarboxylic acid; and
   (3) 0.8–1.3:1 moles of said polyethyleneamine mixture per equivalents of total acid.

12. The polyamidoamine curing agent composition of claim 11 in which the fatty monocarboxylic acid is tall oil fatty acid.

13. The polyamidoamine curing agent composition of claim 11 in which the aromatic dicarboxylic acid is terephthalic acid.

14. The polyamidoamine curing agent composition of claim 11 in which the mixture of triethylenetetramine and N-aminoethyl-piperazine is about a 1:0.15 molar ratio.

15. A coating composition comprising a polyepoxide resin and a polyamidoamine curing agent composition of claim 11.

* * * * *